(12) United States Patent
Pang

(10) Patent No.: US 12,219,486 B2
(45) Date of Patent: Feb. 4, 2025

(54) SYSTEMS AND METHODS FOR POWER SAVING IN DIRECTED MULTICAST SERVICE

(71) Applicant: Cisco Technology, Inc., San Jose, CA (US)

(72) Inventor: Tak Ming Francis Pang, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 878 days.

(21) Appl. No.: 17/082,543

(22) Filed: Oct. 28, 2020

(65) Prior Publication Data

US 2021/0045058 A1    Feb. 11, 2021

Related U.S. Application Data

(63) Continuation-in-part of application No. 16/171,765, filed on Oct. 26, 2018, now Pat. No. 10,855,795.

(51) Int. Cl.
*H04L 12/18* (2006.01)
*H04W 4/06* (2009.01)
*H04W 52/02* (2009.01)

(52) U.S. Cl.
CPC ......... *H04W 52/0235* (2013.01); *H04W 4/06* (2013.01); *H04L 12/189* (2013.01)

(58) Field of Classification Search
CPC .... H04W 52/0235; H04W 4/06; H04L 12/189
See application file for complete search history.

(56) References Cited

U.S. PATENT DOCUMENTS

| | | | |
|---|---|---|---|
| 9,729,337 B2 * | 8/2017 | Janakiraman | H04B 7/155 |
| 10,855,795 B2 * | 12/2020 | Pang | H04L 67/568 |
| 2005/0213576 A1 * | 9/2005 | Stephens | H04L 12/12 370/432 |
| 2008/0181161 A1 * | 7/2008 | Gi Kim | H04W 72/30 370/312 |
| 2010/0111523 A1 | 5/2010 | Hirth et al. | |
| 2013/0064161 A1 | 3/2013 | Hedayat et al. | |
| 2013/0279391 A1 * | 10/2013 | Gupta | H04W 76/40 370/312 |
| 2014/0280727 A1 | 9/2014 | Richards et al. | |
| 2015/0373505 A1 * | 12/2015 | Hsieh | H04W 4/06 370/312 |
| 2016/0014818 A1 * | 1/2016 | Reitsma | H04W 76/50 370/254 |
| 2018/0159960 A1 * | 6/2018 | Farrugia | H04L 61/4511 |
| 2018/0183616 A1 | 6/2018 | Lee et al. | |
| 2019/0191371 A1 * | 6/2019 | Alanen | H04W 52/0216 |
| 2019/0327275 A1 | 10/2019 | Tseng et al. | |

(Continued)

OTHER PUBLICATIONS

IP Multicast Technology Overview, Cisco, 2005, 24 pages.

(Continued)

*Primary Examiner* — Dhairya A Patel
(74) *Attorney, Agent, or Firm* — Patterson + Sheridan, LLP

(57) ABSTRACT

In one embodiment, an apparatus comprises a transmitter for communicating with a client, a receiver, and a controller coupled with the transmitter and receiver, wherein the controller is operable to receive a proxy from the client for traffic from a source and transmit a join to the source on behalf of the client.

18 Claims, 8 Drawing Sheets

(56) References Cited

U.S. PATENT DOCUMENTS

2021/0045058 A1* 2/2021 Pang ................ H04W 52/0235
2024/0291889 A1* 8/2024 Shilimkar ............. H04L 47/115

OTHER PUBLICATIONS

Directed multicast service (DMS), 802.11v Basic Service Set (BSS) on AireOS WLC (Wireless LAN controller), Cisco, DIG: Enterprise Campus Technology, https://www.cisco.com/c/en/us/support/docs/wireless-mobility/wireless-lan-wlan/201015-802-11v-Basic-Service-Set-BSS-on-AireO.html#anc2, 2017, 32 pages.

* cited by examiner

SYSTEMS AND METHODS FOR POWER SAVING IN DIRECTED MULTICAST SERVICE

CROSS-REFERENCE TO RELATED APPLICATIONS

This application is a continuation-in-part of U.S. patent application Ser. No. 16/171,765, filed on Oct. 26, 2018, entitled "SYSTEMS AND METHODS FOR POWER SAVING IN DIRECTED MULTICAST SERVICE," the contents of which are hereby incorporated by reference in their entirety.

BACKGROUND

The present disclosure relates generally to data transmissions.

BACKGROUND

IP (Internet Protocol) multicast is a bandwidth-conserving technology that reduces traffic by simultaneously delivering a single stream of information to potentially thousands of corporate recipients and homes. Applications that take advantage of multicast include video conferencing, corporate communications, distance learning, and distribution of software, stock quotes, and news.

The current 802.11v (i.e., the IEEE (Institute of Electrical and Electronics Engineers) 802.11 Wireless Network Management (Amendment 8)) standard allows stations (e.g., routers/access points and clients/client devices) to exchange information in order to improve their performance. One of the services that 802.11v supports is directed multicast service (DMS). Clients that support DMS can request the access point (AP) send a multicast stream as unicast, like a dynamic media stream function. However, clients that are sleeping or in a power saving mode are not able to join a multicast stream.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

Figure 1:
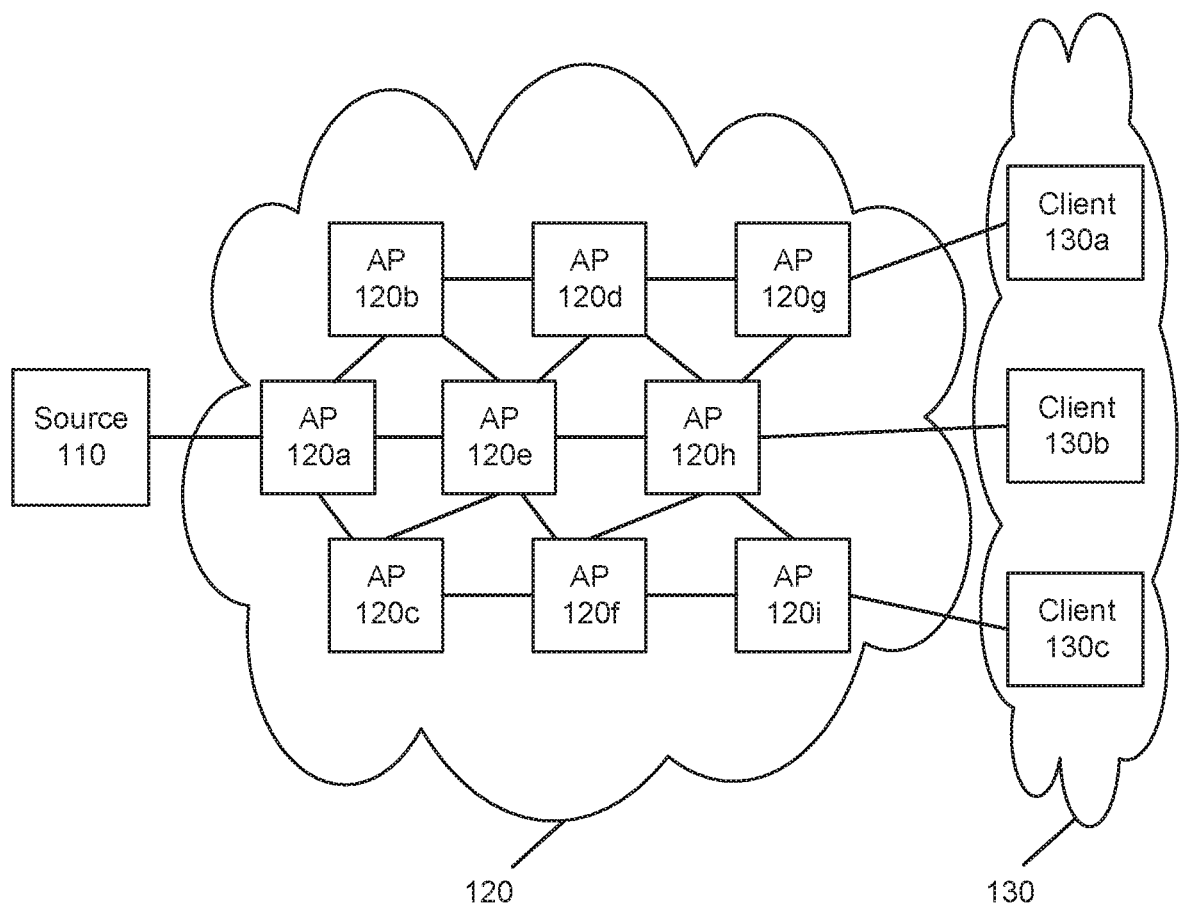
FIG. 1 is an illustration of an exemplary environment for power saving in directed multicast service (DMS)

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an implementation, an apparatus is provided that may include a transmitter for communicating with a client, a receiver, and a controller coupled with the transmitter and receiver. The controller is operable to receive a proxy from the client for traffic from a source and transmit a join, such as an Internet Group Management Protocol (IGMP) join, to the source on behalf of the client.

In an implementation, an apparatus is provided that may include a memory, one or more processors, and logic encoded in one or more tangible media for execution and when executed operable to cause the one or more processors to: enter a sleep mode, awaken from the sleep mode at a query interval, and send a join, such as an IGMP join, for multicast traffic regardless of whether a query is present during the query interval.

In an implementation, a method is provided that may include receiving a proxy from a client for multicast traffic, transmitting a join, such as an IGMP join, to a source of the multicast traffic on behalf of the client, and receiving the multicast traffic from the source.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an exemplary environment 100 for power saving in directed multicast service (DMS) of Internet protocol (IP) multicast. A source 110 provides data (e.g., application data, a video data stream, etc.) to clients 130a, 130b, 130c, etc. (referred to as clients 130) via one or more access points (APs) 120a, 120b, ... 120i, etc. (referred to as access points 120). The source 110, the APs 120, and the clients 130 are operably connected to one or more networks, such as a LAN (local area network), a WAN (wide area network), etc. Although only three clients 130 are shown, and only nine access points 120 are shown, this is not intended to be limiting, and any number of clients and access points may be used depending on the implementation.

Figure 8:
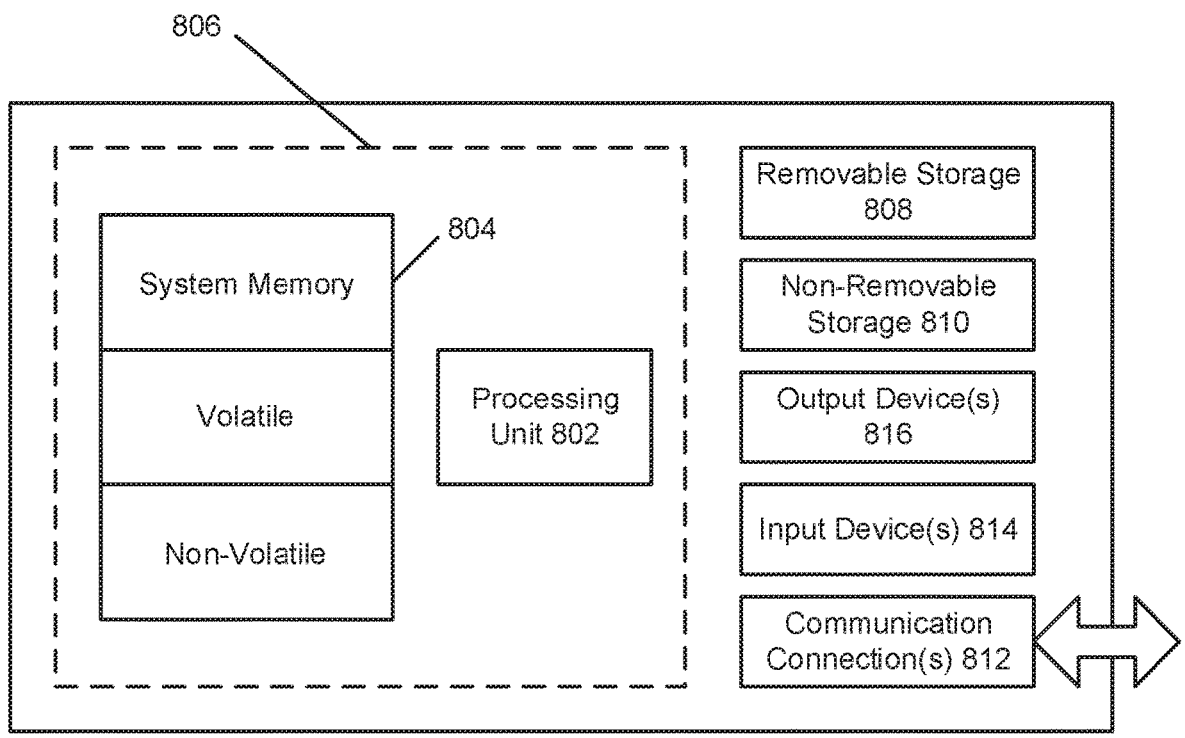
FIG. 8 shows an exemplary computing environment in which example embodiments and aspects may be implemented.

The access points 120 may comprise any type of access point including routers, for example. Each of the clients 130 may comprise any type of wireless station or receiver device for example. The access points 120 and the clients 130 may be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 8 as the computing device 800. The example embodiments described herein refer to the Institute of Electrical and Electronics Engineers (IEEE) 802.11 standards; however, these examples are provided in order to employ well defined terminology for ease of description, and the principles described herein may be applied to any suitable protocol that provides traffic such as multicast streams as described herein.

IP multicast delivers traffic from the source 110 to the clients 130 without burdening the source 110 or the clients 130 while using a minimum of network bandwidth. Multicast packets are replicated in the network at the point where paths diverge by APs 120 (e.g., routers enabled with Protocol Independent Multicast (PIM) and other supporting multicast protocols), resulting in efficient delivery of data to the clients 130.

Multicast is based on the concept of a group. A multicast group is an arbitrary group of clients (such as the clients 130) that expresses an interest in receiving a particular data stream from a source (such as the source 110). This group has no physical or geographical boundaries. The clients 130 can be located anywhere on the Internet or any private internetwork. The clients 130 that are interested in receiving data flowing to a particular group join the group using the Internet Group Management Protocol (IGMP). Clients who are a member of the group can receive the data stream. IP multicast addresses specify a set of IP clients that have joined a group and are interested in receiving multicast traffic designated for that particular group.

The clients 130 indicate their interest by sending an IGMP message to the APs 120 in the network. The APs 120 are then responsible for delivering the data from the source 110 to the clients 130. The traffic from the source 110 will then be delivered only to the network segments (i.e., the APs 120) that are in the path between the source 110 and the clients 130.

More particularly, IGMP is a communications protocol used by the clients 130 and the adjacent access points 120 on networks, such as IPv4 networks, to establish multicast group memberships. IGMP is an integral part of IP multicast. IGMP is used to dynamically register individual clients 130a, 130b, 130c in a multicast group on a particular LAN. The clients 130 identify group memberships by sending IGMP messages to their local multicast AP (e.g., 120a, 120b, etc.). Under IGMP, the APs 120, switches, and a network router listen to IGMP messages and periodically send out queries to discover which groups are active or inactive on a particular subnet.

The current 802.11v standard supports DMS and allows the access points 120 and the clients 130 to exchange information in order to improve their performance. Without the use of DMS, a client 130a, 130b, 130c has to wake up every DTIM (Delivery Traffic Indication Message) interval in order to receive multicast traffic. With DMS, the associated AP 120a, 120b, etc. buffers the multicast traffic for a certain client 130a, 130b, 130c, and when the client 130a, 130b, 130c wakes up, the client 130a, 130b, 130c sends a unicast frame in order to request this traffic. This allows the client 130a, 130b, 130c to sleep for a longer time and save battery power. Multicast frames are transmitted as unicast over the air and are sent at a higher data rate than they otherwise would have been transmitted without DMS. The clients 130a, 130b, 130c can send a DMS request-type add frame in order to ask the associated AP 120a, 120b, etc. to send as unicast the traffic of one or more specific multicast streams.

More particularly, the clients 130 communicate their DMS requests to APs 120 via TSPEC (Traffic Specification) in association and action frames. However, there is no integration with multicast IGMP to improve bandwidth usage.

Additionally, the current DMS specification does not take into consideration or help the clients 130 to sleep across an IGMP query interval. A client 130a, 130b, 130c schedules to wake up at the DTIM interval at which an IGMP query is received by the associated AP 120a, 120b, etc. The traffic can stop if a client 130a, 130b, 130c misses the query and does not reply with a join. The clients 130a, 130b, 130c typically do not synchronize their wake up with the arrival of IGMP query. Any synchronization also may require a client 130a, 130b, 130c to wake up at multiple DTIM intervals to receive an IGMP query as the arrival time of an IGMP query is not exact. This makes power savings by sleeping not practical if a client 130a, 130b, 130c wants to sleep over multiple DTIM intervals.

In other words, conventionally the multicast clients 130a, 130b, 130c need to send an IGMP join upon receiving an IGMP query from one of the APs 120, otherwise the network will stop forwarding multicast stream. In an implementation, an IGMP join is in IGMP v1, and is equivalent to IGMP report in IGMP v3. Depending on the implementation, an IGMP join may be used as the join, or a report, such as an IGMP report, may be used as the join described in the embodiments herein. A client 130a, 130b, 130c itself does not send a join spontaneously without receiving a query (after the first join on the start of application). An IGMP query is a multicast packet, and a client 130a, 130b, 130c that is sleeping to save power would not want to wake up at DTIM intervals to receive multicast including an IGMP query. As a result of sleeping, the client 130a, 130b, 130c would not send any join, and multicast traffic will stop and so will the DMS. Thus, conventionally, the clients 130a, 130b, 130c are not able to achieve power savings associated with a deep sleep.

Moreover, the DMS standard describes conversion of multicast to unicast for the DMS subscribing clients 130a, 130b, 130c, and it does not address two scenarios in which multicast bandwidth are wasted as result of lack of integration between DMS control and IGMP. Firstly, if one of the clients 130 is the only subscriber for the multicast, after DMS conversion, without the integration, the original multicast will still be sent on the air. Because there is no additional listener (e.g., client) to the original multicast traffic, it is a waste of bandwidth. Secondly, the IGMP query transmitting over the air is a waste of bandwidth if one of the APs 120 already knows the multicast subscription from the TSPEC from the DMS clients 130a, 130b, 130c.

In an implementation, an AP, such as the AP 120g, may act as the proxy for a client, such as the client 130a, so that the AP 120g sends an IGMP join in response to receiving an IGMP query, without notifying the client 130a of the IGMP query. In this manner, the client 130a may sleep through DTIM intervals and may not awaken or respond to IGMP queries (which are themselves a type of multicast), but still receive the associated DMS traffic because the AP 120g has sent the IGMP join on behalf of the client 130a. The client 130a may send its proxy (i.e., instructions to act on its behalf) to the AP 120g in a DMS TSPEC or Transaction Class for Data Retention (TCLAS) message (e.g., prior to going to sleep) and the AP 120g will then act as the proxy (to send IGMP joins in response to IGMP queries) for the client 130*a* until the client 130*a* wakes up or until the client 130*a* issues instructions to the AP 120*g* to stop acting as its proxy for IGMP queries.

Thus, upon receiving any IGMP query from the source or any other AP (e.g., a network router), the AP 120*g* will respond with an IGMP join, on behalf of any of the clients 130 it has a proxy for, for the DMS subscriptions associated with the IGMP query. Therefore, in an implementation, and unlike the conventional DMS standard, the client(s) no longer have to wake up at a DTIM interval to receive an IGMP query if the client(s) would like to send a join in response to the IGMP query. Clients can thereby save power by remaining in a power saving or sleep mode.

Clients often sleep to save power. Multicast traffic is broadcast over the air. There is no buffering or saving, so the clients that desire to receive the multicast traffic have to wake up regularly to receive the broadcast (the multicast traffic). However, waking up wastes a lot of power by the client. In accordance with some implementations as described further herein, the client instructs the AP that certain broadcasts (DMS IP multicast broadcasts), convert the multicast to unicast and send to the client.

In an implementation, the AP 120*g* subsequently drops the IGMP query if the AP 120*g* recognizes that there is no other non-DMS IP multicast client associated with the AP 120*g*. The AP 120*g* then, for any requested DMS traffic, converts the multicast to unicast. And if there is no additional non-DMS client for the IP multicast traffic, the multicast frame is dropped and it is not sent over the air. This results in conserving multicast bandwidth.

In an implementation, when a client, that had previously given proxy to the AP (e.g., the client 130*a* had given proxy to the AP 120*g*), disconnects (without sending an IGMP leave itself), the AP sends an IGMP leave on the IP multicast group of the DMS traffic on behalf of the leaving client, thereby conserving additional bandwidth.

In an alternate implementation, a client, such as the client 130*a*, determines the IGMP query interval from the AP, such as the AP 120*g*, and schedules in the future to send an IGMP join immediately after each IGMP query interval begins. The IGMP join is sent by the client 130*a* after each IGMP query interval begins, regardless of whether or not an IGMP query was actually sent or received or is actually pending. The AP 120*g* receives the join as if the client 130*a* had received the query and made a response. In this manner, the AP 120*g* will continue to forward the DMS IP multicast traffic accordingly.

Figure 2:
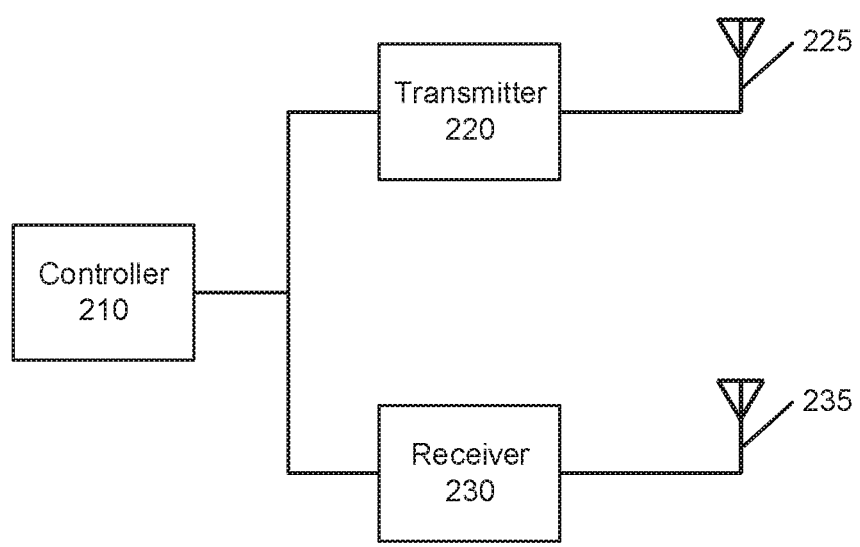
FIG. 2 is a block diagram illustrating an example of a networked device operable in accordance with an example embodiment.

FIG. 2 is a block diagram illustrating an example of a networked device 200, such as an access point, operable in accordance with an example embodiment. The networked device 200 is suitable to provide the functionality described herein for each of the APs 120. Networked device 200 comprises a transmitter 220 for sending data, a receiver 230 for receiving data, and a controller 210 coupled with the transmitter 220 and the receiver 230 and operable to send and receive data via the transmitter 220 and the receiver 230, respectively. In FIG. 2, the transmitter 220 is coupled to an antenna 225 while the receiver 230 is coupled to an antenna 235; however, those skilled in the art can readily appreciate that the transmitter 220 and the receiver 230 can be coupled to a common antenna.

In an example embodiment, the controller 210 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the controller 210 sends one or more multicast streams to one or more clients, such as one or more of the clients 130. The controller 210 is operable to send IGMP queries to one or more of the clients 130, receive IGMP joins from one or more of the clients 130, and act as a proxy for one or more of the clients 130 with respect to IGMP queries and joins as described further herein.

Figure 3:
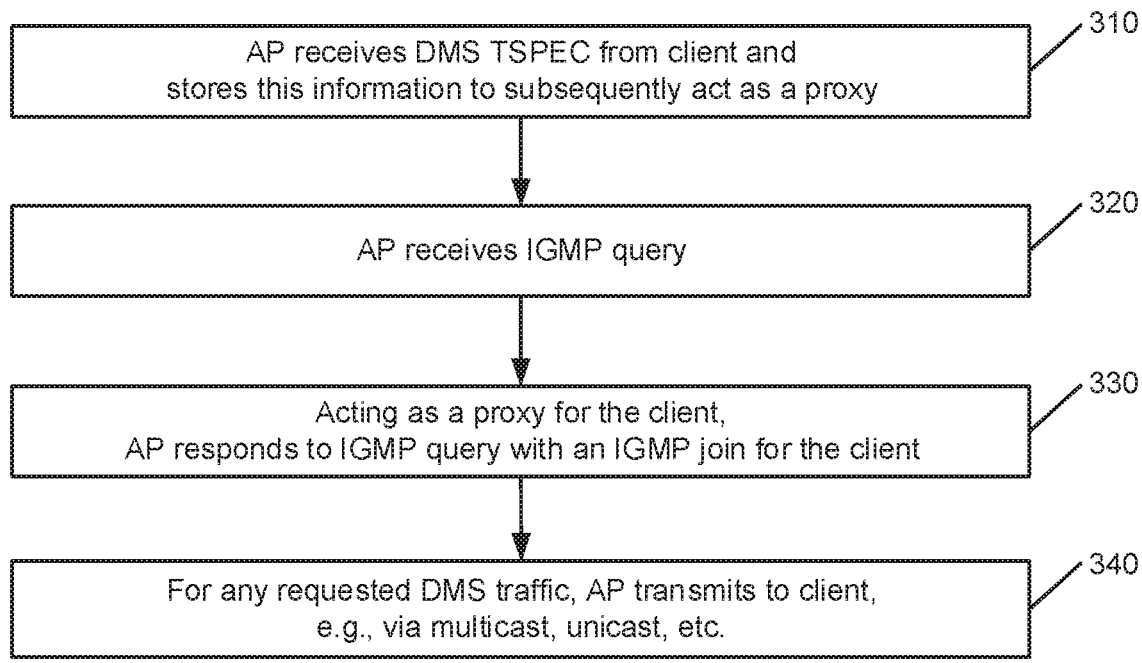
FIG. 3 is an operational flow of an implementation of a method of power saving in DMS.

FIG. 3 is an operational flow of an implementation of a method 300 of power saving in DMS. At 310, an access point, such as one of the access points 120, receives a DMS TSPEC message from a client (e.g., a TCLAS (Transaction Class for Data Retention (TCLAS)) element), such as one of the clients 130. The TSPEC/TCLAS message itself can act as s an indicator or instruction that the AP is to act as the proxy for the client going forward, to respond to IGMP queries with IGMP joins, regardless of whether or not the client is awake or not (e.g., a sleep mode). Alternatively, the TSPEC/TCLAS message may include an indicator or instruction that the AP is to act as the proxy for the client going forward, to respond to IGMP queries with IGMP joins, on behalf of the client. The AP stores this proxy information in an associated memory or storage.

At 320, the AP receives an IGMP query, e.g., from a source, an IP router, another AP, etc. Rather than pass the IGMP query to the client, acting as a proxy at 330, the AP responds to the IGMP query with an IGMP join for the client. In this manner, the client will still receive the associated traffic (the DMS multicast traffic) associated with the IGMP query.

At 340, when the traffic, associated with the IGMP query that the AP responded to with a join, is transmitted, the AP receives the traffic, and subsequently at an appropriate time and using an appropriate transmission technique (e.g., multicast, unicast, etc.), sends the traffic to the client.

Figure 4:
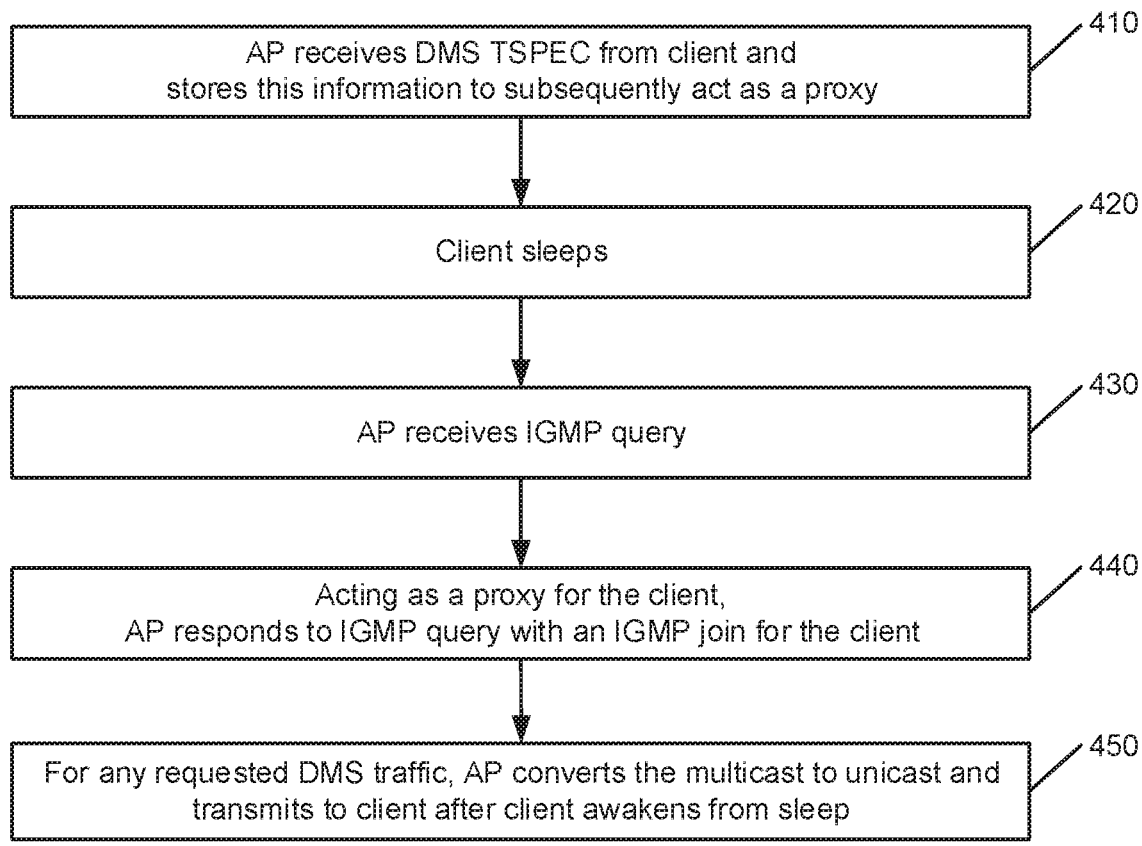
FIG. 4 is an operational flow of another implementation of a method of power saving in DMS.

FIG. 4 is an operational flow of another implementation of a method 400 of power saving in DMS. At 410, similar to 310, an AP receives a DMS TSPEC/TCLAS message from a client. The TSPEC/TCLAS message itself can act as an indicator or instruction that the AP is to act as the proxy for the client going forward, to respond to IGMP queries with IGMP joins, on behalf of the client. Alternatively, the TSPEC/TCLAS message may include an indicator or instruction that the AP is to act as the proxy for the client going forward, to respond to IGMP queries with IGMP joins, on behalf of the client. As in 310, the AP stores this proxy information in an associated memory or storage.

At 420, the client goes into a sleep mode. Because the client has given its join proxy to the AP, the client does not have to schedule to wake up during the DTIM interval or when an IGMP query is expected.

At 430, similar to 320, the AP receives an IGMP query, e.g., from a source, an IP router, another AP, etc., and acting as a proxy at 440 similar to 330, the AP responds to the IGMP query with an IGMP join for the client.

At 450, the multicast traffic associated with the joined IGMP query is transmitted by the source to the AP (e.g., directly or via other APs, routers, switches, network devices, etc.) and received by the AP. The AP converts the multicast traffic to unicast and transmits the unicast traffic to the client after the client awakens from its sleep.

Figure 5:
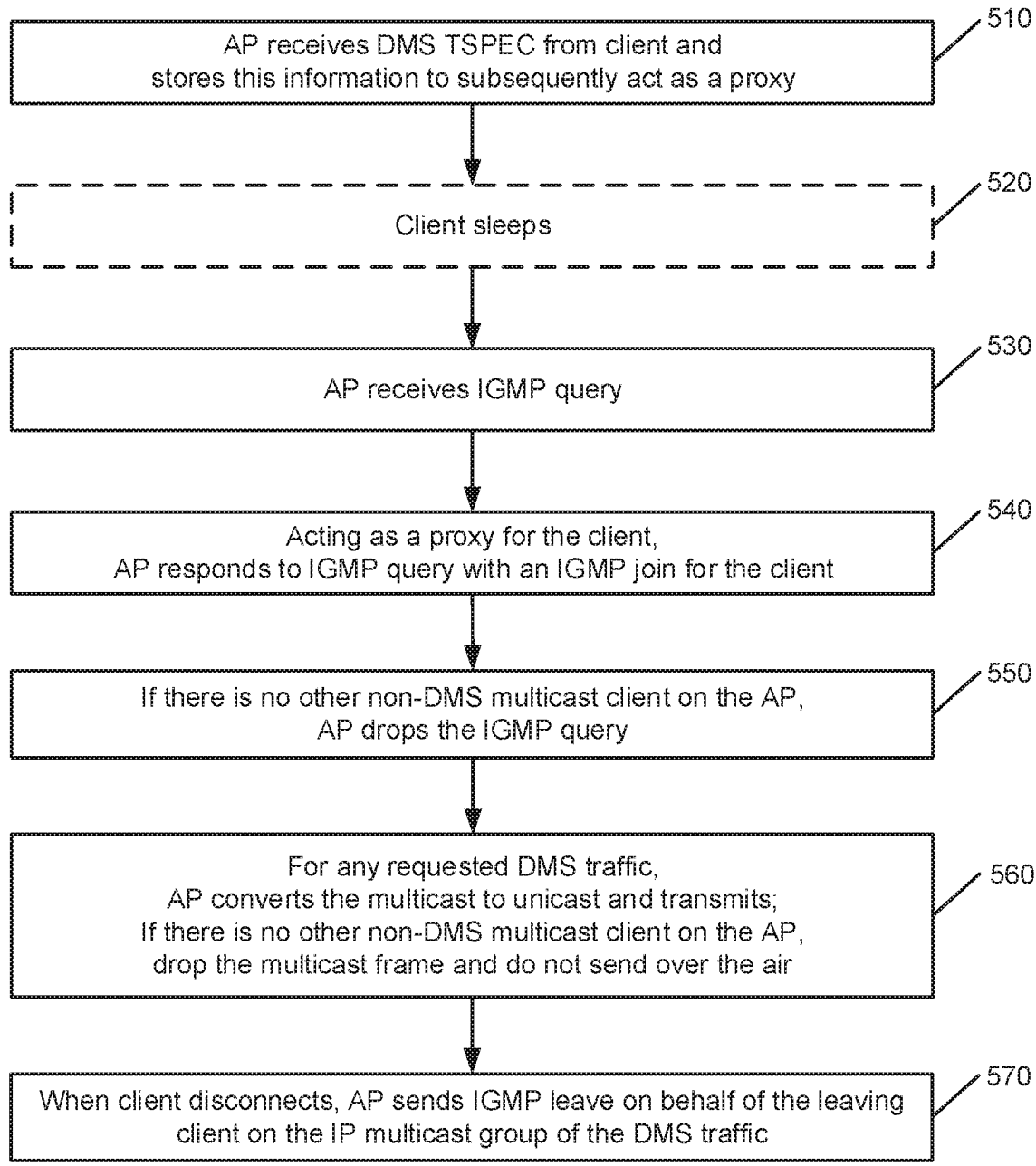
FIG. 5 is an operational flow of another implementation of a method of power saving in DMS.

FIG. 5 is an operational flow of another implementation of a method 500 of power saving in DMS. At 510, similar to 410, an AP receives a DMS TSPEC/TCLAS message from a client. The TSPEC/TCLAS message itself can act as an indicator or instruction that the AP is to act as the proxy for the client going forward, to respond to IGMP queries with IGMP joins, on behalf of the client. Alternatively, the TSPEC/TCLAS message may include an indicator or instruction that the AP is to act as the proxy for the client going forward, to respond to IGMP queries with IGMP joins, on behalf of the client. The AP stores this proxy information in an associated memory or storage.

At 520, the client may go into a sleep mode. In some implementations, entering a sleep mode is optional for the client, and various embodiments herein are not limited by the client entering a sleep mode. Because the client has given its join proxy to the AP, the client does not have to schedule to wake up during the DTIM interval or when an IGMP query is expected.

At 530, similar to 430, the AP receives an IGMP query, e.g., from a source, an IP router, another AP, etc., and acting as a proxy at 540 similar to 440, the AP responds to the IGMP query with an IGMP join for the client.

At 550, the AP determines if there is any non-DMS multicast client associated with the AP, and if there are none, then the AP drops the IGMP query. At 560, for any requested multicast traffic that is received at the AP that is associated with the IGMP join sent at 540, the AP converts that multicast traffic to unicast and transmits it to the client, regardless of whether the client is sleeping or not. If there is no other non-DMS multicast client associated with the AP (as determined at 550), the AP drops the multicast frame and does not send it over the air.

At some point, at 570, the client may disconnect from the network. At that time, the AP recognizes the disconnection and, if the client has not sent an IGMP leave message before disconnecting, then the AP (acting as a proxy for the client) sends an IGMP leave message on behalf of the leaving client on the IP multicast group of the DMS traffic.

Figure 6:
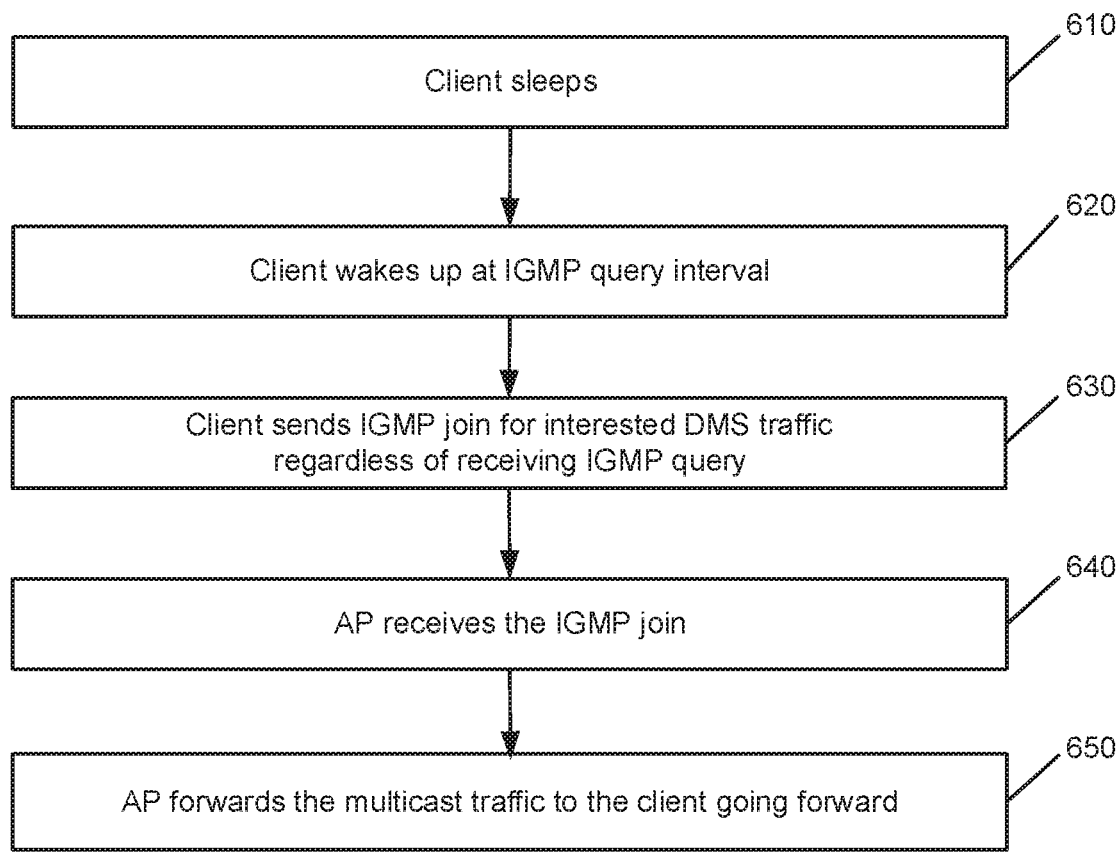
FIG. 6 is an operational flow of another implementation of a method of power saving in DMS.

FIG. 6 is an operational flow of another implementation of a method 600 of power saving in DMS. At 610, a client goes into a sleep mode. At 620, at the time for an IGMP query interval, the client awakens. The client may have scheduled to awaken at the time for the IGMP query interval, using any known technique.

At 630, during the IGMP interval, the client sends an IGMP join to indicate its interest in receiving DMS traffic. The client sends the IGMP join to the associated AP regardless of whether or not an IGMP query is received during the IGMP query interval. Thus, the client sends an IGMP join for the interested traffic with or without receiving an IGMP query. For example, an IGMP query may be arrived during an earlier IGMP query interval that the client had slept through; however, by the sending the IGMP join now during this query interval, the client can indicate that it would like to receive the IP multicast traffic.

At 640, the AP receives the IGMP join. From the AP's perspective, it receives the join as if the client had received the IGMP query in the first place and made a response. At 650, the AP forwards the IP multicast traffic accordingly.

It is noted that multicast without retransmission or without a confirmation mechanism, in particular an IGMP query, can be lost and corrupted in the air during transmission. If an IGMP query from a router is converted into unicast to protect against loss and sent to each client as a separate copy at the same time, and if the number of clients is large, this sending will (1) increase bandwidth usage, (2) cause device CPU spike, and (3) potentially delay other traffic or introduce jitter to timing sensitive traffic. Moreover, a converted unicast IGMP query, if sent not optimized, will require a deep sleep client to wake up at certain beacon intervals and regularly check for the pending converted unicast which will defeat the purpose of power saving in the deep sleep.

Figure 7:
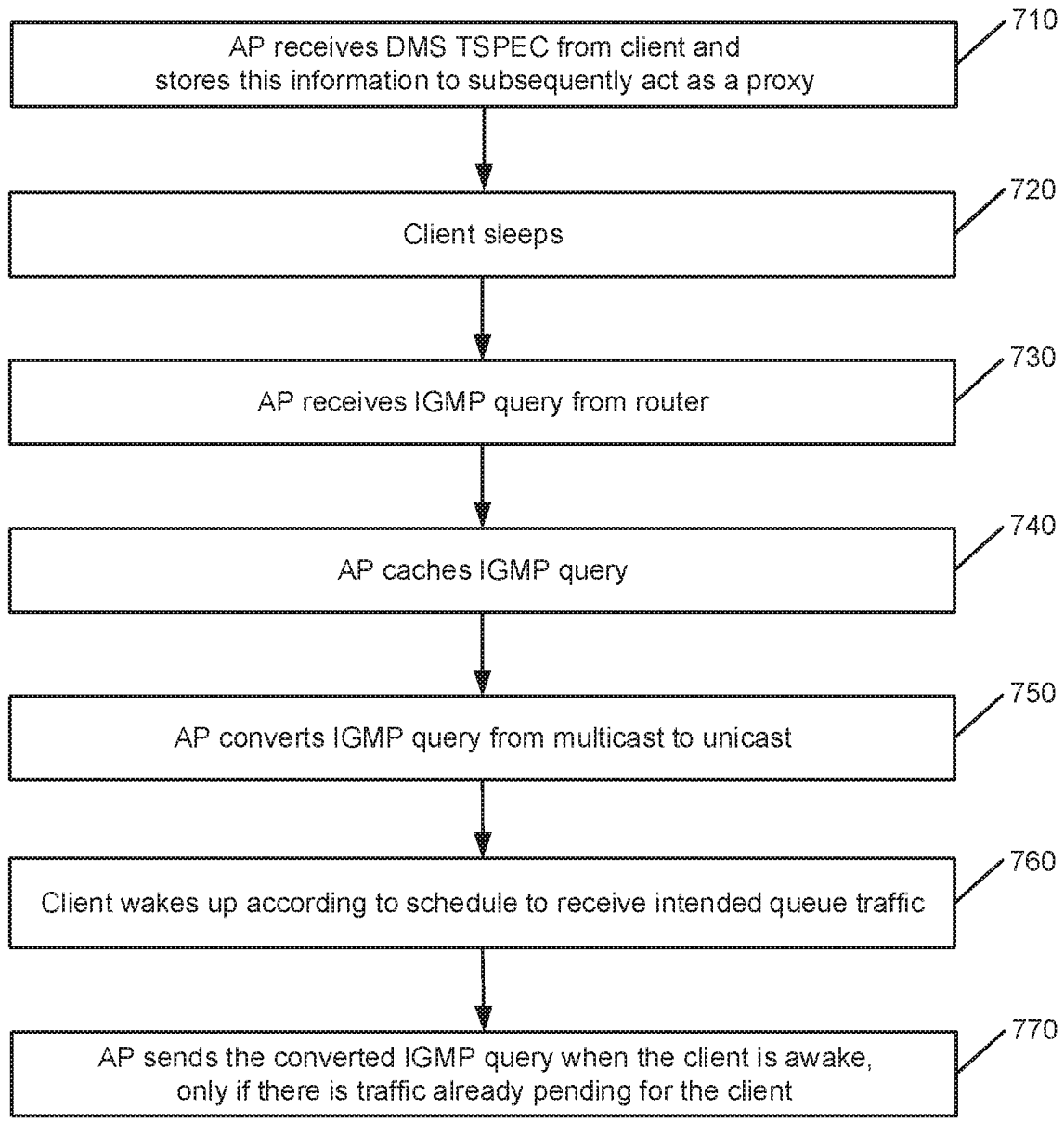
FIG. 7 is an operational flow of another implementation of a method of power saving in DMS.

FIG. 7 is an operational flow of another implementation of a method 700 of power saving in DMS. At 710, an AP receives a DMS TSPEC/TCLAS message from a client. The TSPEC/TCLAS message itself can act as an indicator or instruction that the AP is to act as the proxy for the client going forward on behalf of the client. Alternatively, the TSPEC/TCLAS message may include an indicator or instruction that the AP is to act as the proxy for the client going forward on behalf of the client. The AP stores this proxy information in an associated memory or storage.

At 720, the client goes into a sleep mode or into a power saving mode.

At 730, the AP receives an IGMP query from a router (or other source such as another AP, etc.).

At 740, rather than pass the IGMP query to the client, the AP (acting as a proxy for the client) caches or otherwise stores the IGMP query.

At 750, the AP converts the IGMP query from multicast to unicast. The converted IGMP query may then be stored in storage and/or a queue for later sending to the client.

At 760, the client wakes up according to its wake up schedule to receive the intended queue traffic.

At 770, the AP sends the converted IGMP query to the client when the client wakes up (is awake from 760). In an implementation, the AP sends the converted IGMP query to the client, when the client wakes up (is awake from 760), only if there is traffic already pending for the client. Note that the converted unicast query can be inserted at any part of the queued traffic to the client for prioritization.

Thus, rather than depending on the network protocol timers on multicast control traffic or router's schedule of IGMP query, the AP can send queries to the client between the router query interval. The unicast converted multicast network protocols or query only will be sent if there is application data traffic already pending for client (already cached or queued on the AP radio). This means that the client does not need to wake up extra times or make additional contact to the AP specially for the query. The client just needs to wake up for its intended traffic and conveniently receives the query at the same time. Because clients wake up on different schedules, this avoids a CPU spike and/or a bandwidth spike, and the associated delay to other traffic.

The query from the router can be cached, converted to unicast, and sent on client wake up schedule. The AP will proxy for client to respond on the router query. There is no service breakage.

This optimization mechanism can also be applied on other multicast network protocols if desired, for example, IPV6 router advertisement message or discovery query or mDNS query. Also note that this scheduling optimization can also be applied for any unicast network protocol packet, although it is particularly useful for multicast protocols.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a proxy message from a client, wherein: the proxy message contains information instructing a network device to act as a proxy for the client, and the proxy message comprises a Directed Multicast Service (DMS) Traffic Specification/Transaction Class for Data Retention (TSPEC/TCLAS) message, and
   the proxy message instructs the network device to respond to a query with a join message without notifying the client, and cache at least one of multicast traffic or a multicast network protocol message on behalf of the client;
   receiving the multicast network protocol message from a source, wherein the multicast network protocol message is one of an Internet Group Management Protocol (IGMP) query, an IPV6 router advertisement message or discovery query, or a multicast Domain Name System (mDNS) query;

caching the multicast network protocol message according to the proxy message; and inserting the cached multicast network protocol message into a part of queued traffic to the client for prioritization; and transmitting the multicast network protocol message to the client according to a wake up schedule of the client.

2. The method of claim 1, wherein the multicast network protocol message is in multicast protocol.

3. The method of claim 2, further comprising converting the multicast network protocol message from multicast to unicast prior to transmitting the multicast network protocol message to the client.

4. The method of claim 3, wherein the converting the multicast network protocol message is performed prior to caching the multicast network protocol message.

5. The method of claim 1, further comprising transmitting the multicast network protocol message as unicast to the client.

6. The method of claim 1, wherein the wake up schedule of the client is based on receiving the queued traffic for the client.

7. The method of claim 1, further comprising transmitting the queued traffic to the client.

8. The method of claim 1, wherein the transmitting the multicast network protocol message to the client is performed only if there is traffic already pending for the client.

9. The method of claim 1, wherein the network device is at least one of a router or an access point.

10. An apparatus comprising:
a transmitter for communicating with a client;
a receiver; and
a controller coupled with the transmitter and receiver, wherein the controller is operable to:
receive a proxy message from a client, wherein:
the proxy message comprises a Directed Multicast Service (DMS) Traffic Specification/Transaction Class for Data Retention (TSPEC/TCLAS) message, and
the proxy message instructs the apparatus to respond to a query with a join message without notifying the client, and cache at least one of multicast traffic or a multicast network protocol message on behalf of the client,
receive the multicast network protocol message from a source wherein the multicast network protocol message is one of an Internet Group Management Protocol (IGMP) query, an IPv6 router advertisement message or discovery query, or a multicast Domain Name System (mDNS) query,
cache the multicast network protocol message according to the proxy message, and
insert the cached multicast network protocol message into a part of queued traffic to the client for prioritization, and
transmit the multicast network protocol message to the client according to a wake up schedule of the client.

11. The apparatus of claim 10, wherein the multicast network protocol message is in multicast protocol.

12. The apparatus of claim 10, wherein the controller is further operable to convert the multicast network protocol message from multicast to unicast prior to transmitting the multicast network protocol message to the client.

13. The apparatus of claim 12, wherein the converting the multicast network protocol message is performed prior to caching the multicast network protocol message.

14. The apparatus of claim 10, wherein the controller is further operable to transmit the multicast network protocol message as unicast to the client.

15. The apparatus of claim 10, wherein the wake up schedule of the client is based on receiving the queued traffic for the client.

16. The apparatus of claim 10, wherein the controller is further operable to transmit the queued traffic to the client.

17. The apparatus of claim 10, wherein the transmitting the multicast network protocol message to the client is performed only if there is traffic already pending for the client.

18. The apparatus of claim 10, wherein the apparatus is at least one of a router or an access point.

* * * * *